United States Patent [19]

Nagae et al.

[11] 4,149,151

[45] Apr. 10, 1979

[54] DISPLAY DATA SYNTHESIZER CIRCUIT

[75] Inventors: Yoshiharu Nagae, Hitachi; Hideaki Kawakami, Mito, both of Japan

[73] Assignee: Hitachi, Ltd., Japan

[21] Appl. No.: 798,866

[22] Filed: May 20, 1977

[30] Foreign Application Priority Data

May 25, 1976 [JP] Japan ................................ 51-60390

[51] Int. Cl.[2] ............................................ G06K 15/18

[52] U.S. Cl. .................................... 340/765; 340/801; 340/802

[58] Field of Search ............ 340/336, 324 AD, 324 M

[56] References Cited

U.S. PATENT DOCUMENTS

| | | | |
|---|---|---|---|
| 3,614,769 | 10/1971 | Coleman et al. | 340/336 |
| 3,715,744 | 2/1973 | Ito et al. | 340/336 |
| 3,803,589 | 4/1974 | Hatsukano et al. | 340/336 |
| 3,895,372 | 7/1975 | Kavi et al. | 340/336 |
| 3,898,646 | 8/1975 | Washizuka et al. | 340/336 |

*Primary Examiner*—David L. Trafton
*Attorney, Agent, or Firm*—Craig & Antonelli

[57] ABSTRACT

A display data synthesizer circuit is used for a display panel having a multiplicity of display elements selectively excited for display of the desired pattern of characters or symbols. The display elements are divided into a plurality of sections which are sequentially driven and in driving each section, selected display elements of that section are excited simultaneously for a predetermined period of time, by sequentially synthesizing and holding the display data for the respective sections in the order of the driving operations thereof. The circuit includes a series output shift register and a parallel output shift register. The series output shift register stores a plurality of bits included in a display data for one section, applied thereto bit-serially at a first repetitive speed, and outputs the stored data at a second repetitive speed higher than the first repetitive speed. The parallel output shift register receives bit-serially the display data derived from the series output shift register, and holding it for a predetermined period of time, applies it bit parallelly to the drive circuit of the display panel for that same period. The series output shift register receives and stores the display data for the next section during the time when the parallel output shift register applies the display data held thereby to the drive circuit. The second repetitive speed is so selected as to make the data transfer time from the series output shift register to the parallel output shift register sufficiently short so that the display disturbances of the display panel are not substantially recognized visually.

8 Claims, 11 Drawing Figures

DISPLAY DATA SYNTHESIZER CIRCUIT

BACKGROUND OF THE INVENTION

1. FIELD OF THE INVENTION

This invention relates to a display data synthesizer circuit, or more in particular to an improvement in the display data synthesizer circuit used for a display panel which displays a desired pattern by selective excitation of a multiplicity of display elements included in the display panel.

2. DESCRIPTION OF THE PRIOR ART

A well-known display panel has a multiplicity of display elements and displays a desired pattern such as characters and symbols by selective excitation of the display elements. An example is a display panel of liquid crystal matrix type. In this type of display panel, the display elements are generally divided into a plurality of sections. For selective excitation of the display elements, the plurality of sections are driven sequentially in accordance with a predetermined order. In driving each section, selected display elements of that particular section are simultaneously excited for a predetermined period of time. In order to control the selective excitation of the display elements in driving each section according to the desired display pattern, a display data synthesizer circuit synthesizes the display data corresponding to each section. It maintains the particular display data and applies it to a drive circuit during a predetermined driving period for that section. In order to obtain a clear display pattern, it is necessary that there is no substantial interval between the driving periods for successive sections. In order to achieve this object, a conventional display data synthesizer circuit includes a parallel output shift register and a latch circuit. The parallel output shift register stores the bits of a display data for one section applied thereto in bit-series and produces them in parallel. The latch circuit receives the bits of the display data in parallel from the shift register, holds it for a predetermined period of time, and during that period, applies the display data to the drive circuit in parallel. As long as the latch circuit applies to the drive circuit the display data held thereby, the parallel output shift register receives and stores the display data for the next section. In view of the fact that each section generally contains a great number of display elements and that the display data for each section includes bits in the number equal to that of the display elements, the latch circuit, which receives in parallel signals corresponding to the bits of the display data for each section and produces the same signals in parallel, requires terminals in the number at least twice that of the bits. Therefore, in the case where a display data synthesizer circuit is assembled in IC packages with, say, 14, 16 or 32 terminal pins, a great number of the IC packages are required, thus posing the problems of consumption of long time for wiring work.

SUMMARY OF THE INVENTION

Accordingly, it is the primary object of the invention to provide a display data synthesizer circuit which can be assembled with a smaller number of IC packages.

Another object of the invention is to provide a display data synthesizer circuit which can be assembled with a smaller number of IC units without deteriorating the quality of the display pattern.

Still another object of the invention is to provide a display panel of matrix type including a display data synthesizer circuit as described above.

According to one aspect of the present invention, the display data synthesizer circuit includes a series output shift register and a parallel output shift register connected in cascade therewith. The series output shift register is for receiving bit-serially and storing a character pattern input with bits as many as the display elements of one section thereby to synthesize the display data for that section. The parallel output shift register, on the other hand, holds and parallelly produces, during a period for one section-display, the section display data transferred from the series output shift register. The data transfer from the series output shift register to the parallel output shift register is carried out within a time sufficiently shorter than a scanning time for one section-display, thereby substantially preventing the data transfer from deteriorating the display quality.

According to another aspect of the invention, in order to further improve the data transfer speed from the series output shift register to the parallel output shift register, display data for each section are divided into a plurality of groups, and the transfers of the display data of the respective groups are made in parallel, but for each group, data transfer from the series output shift register to the parallel output shift register is conducted in bit serial.

DESCRIPTION OF THE PREFERRED EMBODIMENTS

The display data synthesizer circuit according to the present invention is used with a display panel of the type which includes a multiplicity of display elements for displaying a desired pattern by selectively driving the display elements. One example of type of display panel is a display panel of the liquid crystal matrix type. For convenience of explanation, the description below will refer to a case in which the display data synthesizer according to the present invention is used with a display panel of the liquid crystal matrix type.

Figure 1:
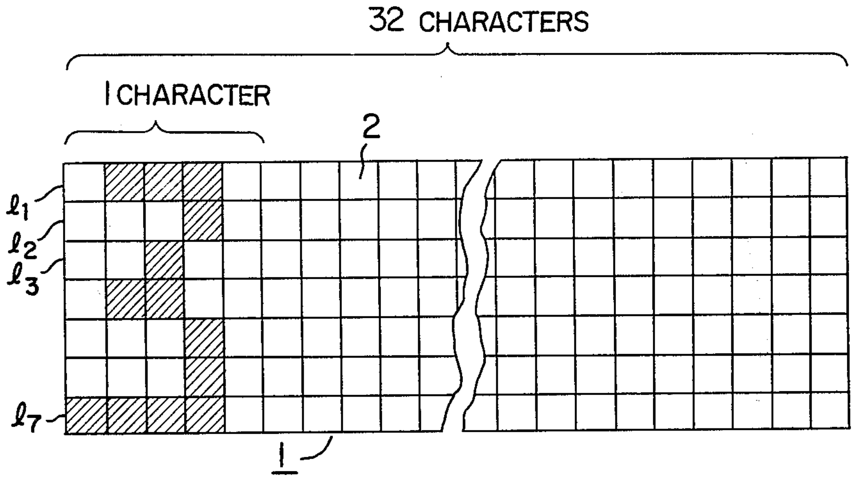
FIG. 1 is a diagram showing a schematic diagram of a display panel of matrix type.
Figure 2:
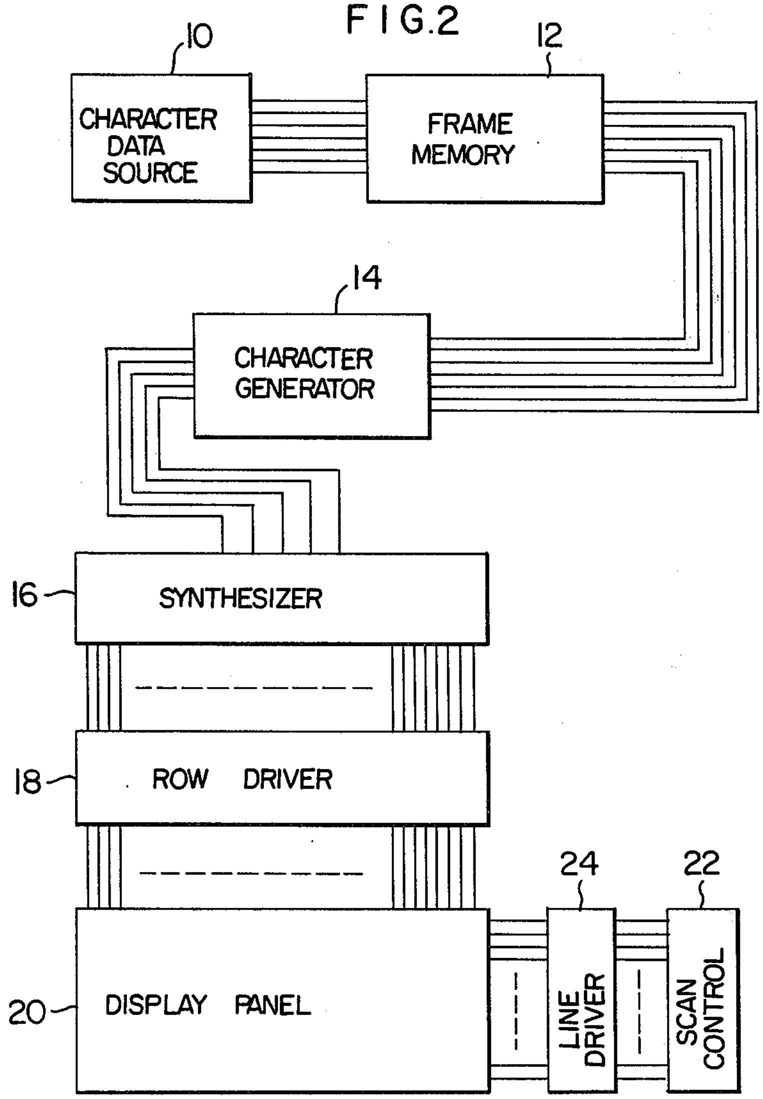
FIG. 2 is a circuit block diagram showing a display apparatus of liquid crystal matrix type using a line display data synthesizer circuit according to the present invention.

In a display panel of liquid crystal matrix type having a rectangular effective area for display, a layer of liquid crystal is provided to extend over the effective display area and a desired pattern is displayed by exciting individual portions of the layer disposed in a matrix of rows and lines selectively according to the desired pattern thereby changing the light permeability of the excited portions from that of the non-excited portions. Thus, the layer of liquid crystal acts as if it includes a plurality of individual display elements which are disposed in a matrix of rows and lines and are capable of being excited selectively and independently of each other. We, therefore, refer to each of the portions of the layer of liquid crystal as a "display element" hereinafter. In FIG. 1 which shows schematically a display panel of the liquid crystal matrix type, such display elements are represented by small rectangular frames 2 disposed in matrix array on the effective display area 1 of the display panel. This display apparatus is well known as disclosed in U.S. Pat. No. 3,922,667 issued Nov. 25, 1975 on U.S. Patent Application Ser. No. 453,066 entitled "Image or Segment Pattern Forming X - Y Matrix Addressing Method"; "Large-Scale Liquid Crystal Matrix Display" K. Ono, et al, page 34, SID '76 Digest; "Large Scale Integration for Display Screens" T. P. Brody, IEEE Transaction on Consumer Electronics Vol. CE-21, No. 3, August 1975. A block diagram of the drive circuit used for character display is illustrated in FIG. 2. A character data source 10 includes a keyboard, an encoder, and a computer output unit. A character to be displayed, which is entered by the keyboard, is converted into a code of 6 to 8 binary bits in the well-known ASC II code, by means of an encoder, for example. A character data representing one section of the display panel 20 is produced and stored in the frame memory 12. The character data in the frame memory 12 is read out with a predetermined timing and transmitted to the character generator 14. The character data is decoded and converted into a character pattern data by the character generator 14. A character pattern data includes signals for designating excitation of the selected display elements for display on the display panel. For example, assume that, as shown in FIG. 1, the display panel provides for display of 32 characters, and includes display elements arranged in 5 rows and 7 lines $l_1, l_2, \ldots l_7$ for each character, each line including a total of 160 display elements, and that the seven lines of display elements are sequentially driven in the so-called line sequence scanning mode. The character generator 14 applies line display data of 160 bits corresponding to 160 display elements for each line, each bit being "1" when the corresponding display element is to be excited, and "0" when it is not to be excited, to a line display data synthesizer circuit 16, sequentially, character by character, each character including 5 bits applied in parallel. The synthesizer circuit 16, upon receipt of the line display data of 160 bits, holds them for a predetermined period of time, during which time it transmits signals, each corresponding to one bit, to a row driver 18. The row driver 18, in turn, drives the 160 rows to excite them at predetermined voltage levels corresponding to the respective signals. The seven lines of the display panel, on the other hand, are driven by a line driver 24 for a predetermined period of time for each line in accordance with a predetermined sequence controlled by the scan control circuit 22. The drive system for this liquid crystal matrix type display panel may employ the voltage equalization system as disclosed in the U.S. Pat. No. 3,976,362 issued on Aug. 24, 1976 to Hideaki Kawakami, one of the inventors of the present application. In such a system, each display element is driven to an excited state (hereinafter referred to as the "on" state) or a non-excited state (hereinafter referred to as the "off" state) depending on the level of a resultant voltage of the drive voltages applied to the line and row involved. According to the voltage equalization system, each element to be in the non-excited state is also impressed with a voltage of a level insufficient to render the display element in the on-state.

Figure 3:
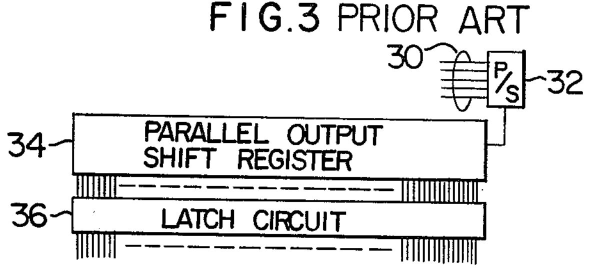
FIG. 3 PRIOR ART
FIG. 3 is a block diagram showing the configuration of a conventional display data synthesizer circuit.
Figure 4:
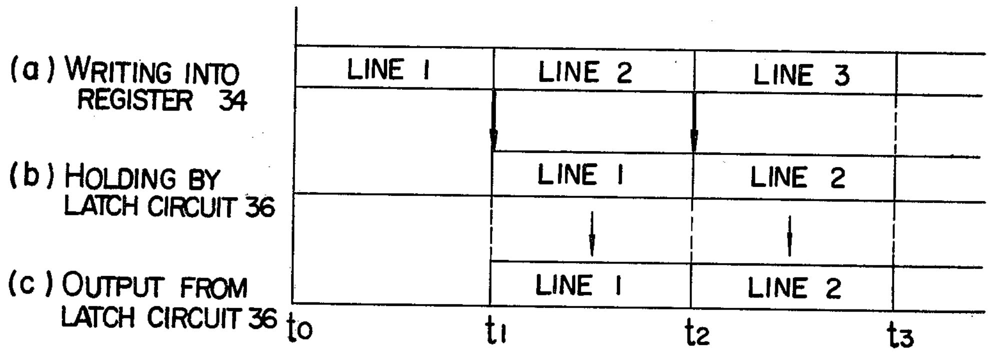
FIG. 4 PRIOR ART
FIG. 4 is a time chart for explaining the operation of the circuit of FIG. 3.

The display data synthesizer circuit 16 receives 5-bit character pattern data inputs from the character generator 14, synthesizes these inputs into a line character pattern data for one display line, and holds it for one-line scanning time. A conventional synthesizer of this type is configured as shown in FIG. 3. FIG. 4 is a diagram for explaining the operation of this circuit. A parallel/series converter circuit 32 receives from the character generator a 5-bit character pattern data input 30 including parallel five bits for one line of one character, and produces the five bit signals in series. The five bit signals, as shown in FIG. 4(*a*), are written in series in the parallel output shift register 34. Five bits for the same line of the next character are similarly written in series. In this way, 160 bits for the same line of 32 characters are sequentially written into the register 34 during a time interval $t_0$–$t_1$, and synthesized as a line display data including 160 bits for one display line. The 160-bit line display data synthesized by the shift register are then parallelly and instantaneously transferred to and held for the next time interval of $t_1$–$t_2$ by the latch circuit 36 as shown in FIG. 4(*b*). During the time interval of $t_1$–$t_2$, the latch circuit 36 produces parallelly to the row driver 18 the line display data of one display line on the one hand and on the other hand, a character pattern data of the next display line is written in the shift register 34 as shown in FIG. 3. As seen from the foregoing description, during each time interval period for scanning one display line, i.e. $t_1$–$t_2$, or $t_2$–$t_3$ in FIG. 4, the latch circuit 36 holds the line display data for that line, while the shift register 34 prepares a line display data for the next display line. Thus liquid crystal character display is provided in the line sequence scanning mode.

The fact that a latch circuit is used in the line display data synthesizer circuit as mentioned above poses, as apparent from FIG. 3, the problem of an increased expense and labor for wiring because of a great number of input and output wirings for parallel bits involved. Even when using integrated circuits presently available which incorporate only 4 bits for each package, a latch circuit of 160 bits as described above will require 40 integrated circuits. This is not desirable from the standpoint of reduction in circuit size or cost.

Figure 5:
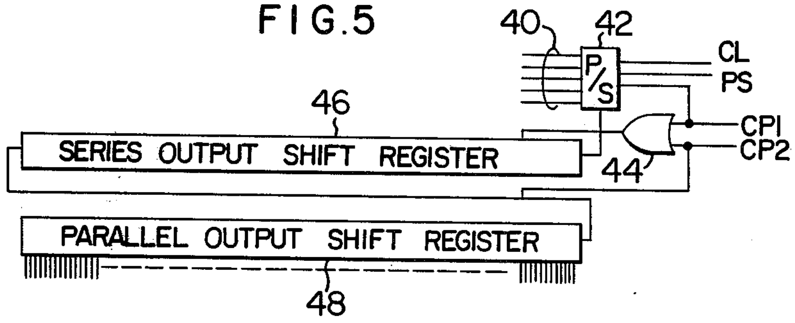
FIG. 5 is a block diagram showing an embodiment of a display data synthesizer circuit according to the present invention.

An example of the display data synthesizer circuit according to the present invention is shown in FIG. 5. A 5-bit character pattern data input 40 representing one line of one character is applied through the parallel/series converter circuit 42 to the series output shift register 46 where it is written bit serially. After the bits representing one line of one character are written in the shift register 46, the content of the converter circuit 42 is cleared by a clear signal CL. And then, five bits representing the same line of the next character are inputted and applied to the shift register 46 by means of a preset signal PS. Thus, 160 bits representing one display line of the display panel are written in the shift register 46. The parallel output shift register 48 is adapted for series/parallel conversion of the output of the shift register 46. Each of the shift registers 46 and 48 has a capacity for storing a character pattern data of one display line of the display panel. An OR gate 44 is provided for receiving clock pulses CP1 and CP2 for determining the timings in writing and reading operations of these registers. As compared with the clock pulses CP1 which determine the timing of data writing in the series output shift register 46, the clock pulses CP2 which determine the timing in data transfer between the shift registers 46 and 48 have a sufficiently high frequency. In other words, the frequency of the clock pulses CP2, which are used to regulate the data transfer speed, is determined in such a manner as to complete the data transfer of the bits for one display line within a time considerably shorter than a time interval $t_1$–$t_2$ allotted for scanning one display line. As a typical example, the clock pulses CP1 and CP2 have frequencies of 250 KHz and 1.2 MHz, respectively.

Figure 6:
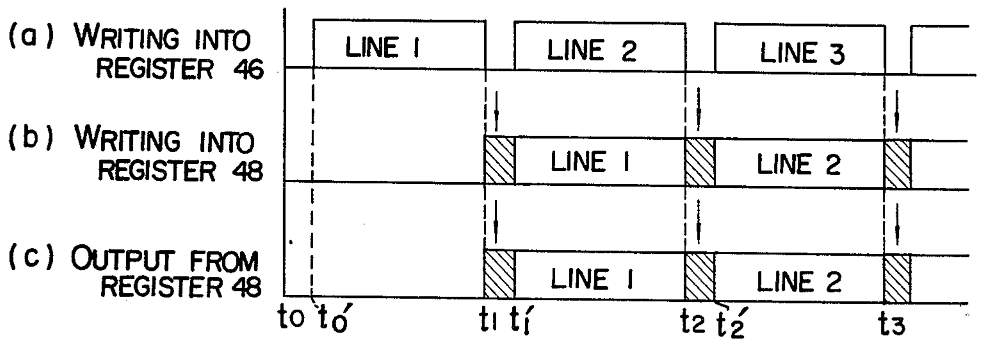
FIG. 6 is a diagram for explaining the operation of the circuit of FIG. 5.

The operation of the circuit of FIG. 5 will be described with reference to FIG. 6. The bits, for example 160 bits, for the display data representing one display line of the display panel are written in series in the series output shift register during a time interval of $t_0'$–$t_1$ shown in FIG. 6(*a*). Next, during a time interval of $t_1$–$t_1'$ as shown in FIG. 6(*b*), the written display data is written bit serially in the parallel output shift register 48 at timing of the clock pulses CP2. The time interval $t_0'$–$t_1$ during which the display data for one display line is written into the register 46 is almost equal to one line scanning period ($t_0$14$t_1$) allotted for scanning one display line. However, the time interval $t_1$–$t_1'$ during which the same display data is written in the register 48 is much shorter than the one line scanning period since the frequency of the clock pulses CP2 is much higher than that of CP1. The register 48 holds for a time interval corresponding to the one line scanning period the written display data, while at the same time applying the display data to the row driver in bit parallel. During the time interval of $t_1'$–$t_2$, display data for the next display line are similarly written in the shift register 46.

Referring to FIGS. 6(*b*) and 6(*c*), the hatched part corresponds to the data transfer period, during which time an abnormal output may be produced at the driver output side. By making the frequency of clock pulses CP2 higher as mentioned above, however, the operation margin caused by the abnormal output is reduced to a negligibly small level, thus preventing any visual reduction in display quality. In this way, while the line display data for one display line is held bit parallel by the parallel output shift register 48 for the purpose of display on the one hand, a line display data for the next display line is synthesized by means of the series output shift register on the other hand. Thus, in spite of a simple circuit configuration, line display data can be smoothly synthesized and held.

Figure 7:
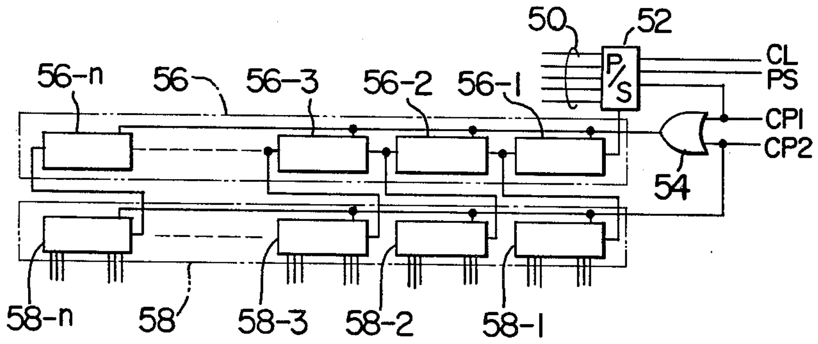
FIG. 7 is a block diagram showing the configuration of another embodiment of the display data synthesizer according to the present invention.

Another embodiment of the present invention is shown in FIG. 7. Although this circuit operates in a manner similar to the foregoing embodiment, it has a feature in the configuration and operation of data transfer. A parallel/series converter to which a 5-bit character pattern data input 50 is applied bit parallel converts the input into a bit-serial data and applies it to the series output shift register 56 in the next stage. The shift register 56 is divided into n sections 56-1 to 56-n, for example 10 sections. Each of the register sections is adapted to store a 16-bit data and produce it bit-serially. A parallel output shift register 58 is for storing bit-serially the output of the shift-register 56 and producing it bit-parallelly. This shift register 58 includes n series-connected sections 58-1 to 58-n, for example 10 sections, corresponding to the sections of the shift register 56. Each of the register sections 58-1 to 58-n of the shift register 58 receives bit-serially 16 bits of character pattern data (1/10 of the line display data) from a corresponding one of the register sections 56-1 to 56-n, and produces them bit-parallelly. From the output of the parallel output shift register 58, the 160-bit character pattern data required for display of one display line for 32 characters each by 5×7 dot system is produced bit-parallelly. Through the OR gate 54 either the writing clock pulses CP1 or the transfer clock pulses CP2 are applied to the register sections 56-1 to 56-n of the series output shift register 56. The clock pulses CP1 are also applied, together with the clear input CL and the preset input PS, to the parallel/series converter circuit 52. The clock pulses CP2 are applied also to the register sections 58-1 to 58-n of the parallel output shift register 58.

Figure 8:
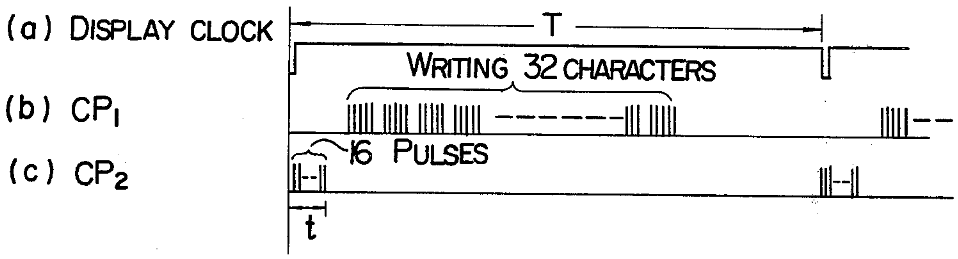
FIGS. 8 and 9 are time charts for explaining the operation of the circuit shown in FIG. 7.
Figure 9:
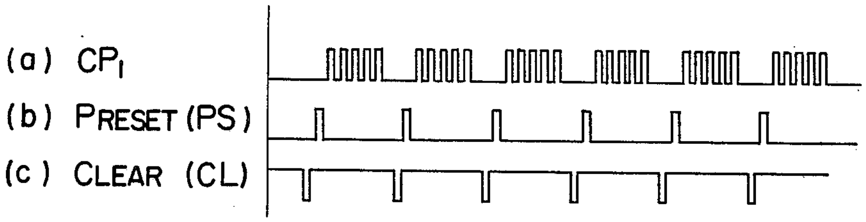

The diagram of FIG. 8 shows the relation of timing between the display clock signal for selectively scanning the display lines of the display panel and the clock pulses CP1 and CP2. The period T of the display clock signal shown in FIG. 8(*a*) corresponds to the period during which the scanning driver selects one display line. As shown in FIG. 8(*b*), the write clock pulses CP1, in order to permit one line display data for 32 characters to be written in the register 56 during the period T, include 32 pulse trains each containing 5 pulses. These pulses have a relation in timing with the preset input PS and the clear input CL as shown in FIG. 9. The transfer clock pulses CP2, as shown in FIG. 8(*c*), include 16 pulses during the first t seconds in the display clock period T. During this time t, data transfer is carried out.

In the operation of the circuit of FIG. 7, it will be seen from FIGS. 8 and 9 that 16 bits of the line display data are parallelly transferred from the register sections 56-1 through 56-n of the series output shift register 56 to the corresponding register sections 58-1 through 58-n of the parallel output register 56 in timing of the transfer clock pulses CP2 during the first t seconds in the clock period T. In this case, data for each of the register sections transferred in series to the corresponding register section, while data transfer from the respective register sections is parallelly made as a whole. In this way, the transfer of 160-bit line display data from the series output shift register 56 to the parallel output shift register 58 requires only a time equal to that required for series transfer of 16 bits, thus making possible highspeed transfer of 160 bits. During one clock period T less the transfer time t, i.e., T−t, the series output shift register 56 synthesizes the line display data by reading a character pattern data for one display line bit serially from the parallel/series converter circuit 52 on one hand and from the parallel output shift register 58, on the other hand, the line display data previously synthesized and transferred thereto is applied to the row driver in bit parallel form. In this way, a line display data for a given display line is synthesized and held. This operation is repeated for all the lines of the display panel in synchronism with the line sequence scanning operation, thus making depiction of desired characters on the display screen. The data transfer speed is of course determined at a sufficiently high level in this embodiment.

A main advantage of the circuit of FIG. 7 lies in that, since line display data are divided into several groups and parallelly transferred between shift registers, high speed data transfer is possible without using an extremely high frequency of the transfer clock pulses. The circuit of FIG. 7, therefore, is suitably applied especially to a character display apparatus having a great number of characters involved in one display line and a great amount of data to be transferred during one line scanning period.

Figure 10:
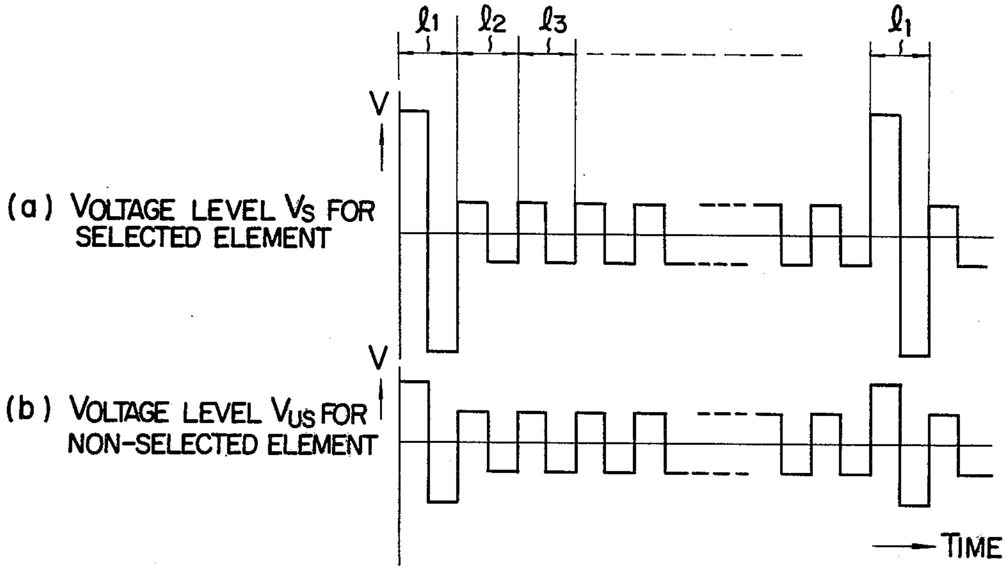
FIGS. 10 and 11 are diagrams showing voltage waveforms applied to the display elements of the liquid crystal display panel.
Figure 11:
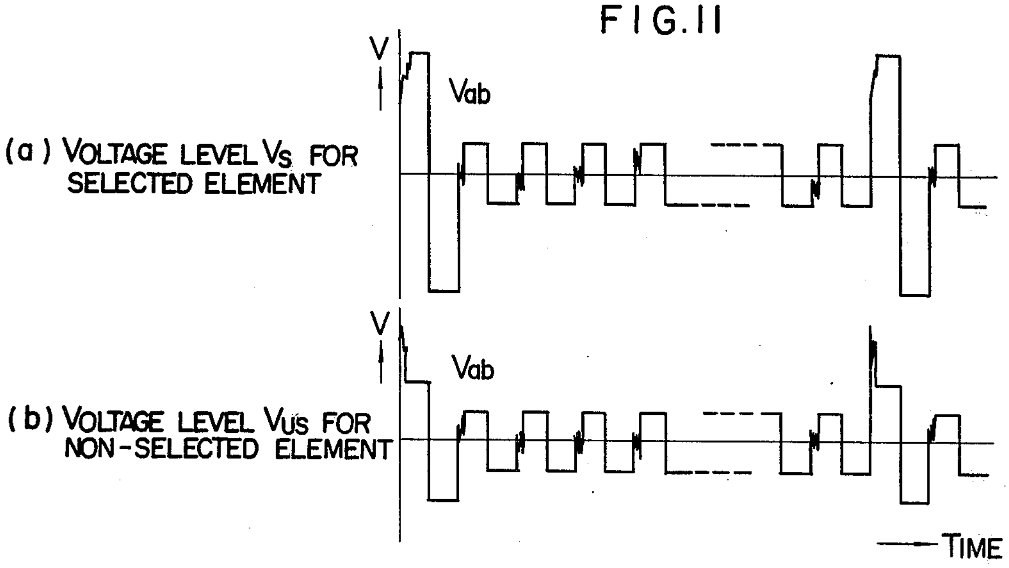

FIGS. 10 and 11 show a comparison of drive voltage waveforms of the liquid crystal display panel between a system using a conventional line display data synthesizer circuit shown in FIG. 3 and a system using the circuit according to the present invention shown in FIG. 7. The diagrams of FIG. 10(*a*) and FIG. 11(*a*) each shows a waveform of synthesized voltage Vs of the line drive voltage and the row drive voltage applied to one display element to be excited, called the selected element. Characters $l_1$, $l_2$, $l_3$, so on, show the periods during which lines $l_1$, $l_2$ and $l_3$ of the display panel are selected for scanning, respectively. In FIGS. 10(*a*) and 11(*a*), the selected display element is present in the line $l_1$, and therefore, only during the scanning period for the line $l_1$, the level of the synthesized voltage is higher than the threshold voltage required for excitation of the liquid crystal, thereby turning on the display element. The diagrams of FIG. 10(*b*) and FIG. 11(*b*), on the other hand each shows a waveform of a synthesized voltage Vus applied to one display element in the line $l_1$ and to be non-excited, called the non-selected element. The voltage level for the non-selected element is higher during the scanning period for the line $l_1$, because the drive voltage of the line driver is applied to the line when it is scanned. However, this voltage level is lower than the threshold voltage of the liquid crystal, so that, the display element is in the off state. The ratio $\alpha$ between the effective values of the voltage level Vs for the selected element and the voltage level Vus for the non-selected element, Vs√Vus is called an operation margin. The higher the value $\alpha$, the better the contrast of the display screen.

By comparison between FIGS. 10 and 11, it is seen that, in the case of FIG. 11 relating to the present invention, an abnormal voltage Vab is superimposed on the driver output voltages Vs and Vus. Although this abnormal voltage Vab may undesirably cause flickers for deterioration of display quality, it has been proved that such deterioration of the display quality is satisfactorily prevented if the period of generation of such a voltage is rendered sufficiently short as compared with the response time of the liquid crystal. Therefore, this abnormal voltage poses no problem in practical application. Further, the abnormal output Vab reduces the operation margin $\alpha$. It has also been confirmed, however, that by reducing the data transfer time t mentioned above to a level about 5% of the clock period T, the reduction of the operation margin $\alpha$ is suppressed to an extent that the deterioration of contrast is not visibly recognized.

From the detailed explanation above, it will be apparent that unlike the conventional display data synthesizer circuit which combines a parallel output shift register with a latch circuit, the present invention comprises a combination of a series output shift register and a parallel output shift register, with the result that the latch circuit requiring a great number of terminals is replaced by the series output shift register with a fewer number of terminals, thus simplifying the circuit configuration. This invention, therefore, is effective in reducing the size and cost of the character display apparatus using a liquid crystal. Especially in the case where integrated circuits are used in the circuit of the invention, highly integrated MOSICs may be used as the series output shift register, thereby considerably reducing the number of integrated circuits used. This fact also greatly reduces the size and cost. These advantages become more conspicuous when the size of display is enlarged.

Furthermore, it is obvious that in embodying the present invention, the number of bits of the shift registers or the groups for transfer may be changed in accordance with the size of display or the circuit elements used.

We claim:

1. A display data synthesizer circuit used with a display panel including a multiplicity of display elements for display of a desired pattern by selectively exciting said display elements, said display elements being divided into a plurality of sections to be sequentially scanned and driven, said display data synthesizer circuit serving to synthesize and hold display data for each of said sections for a predetermined period of time in order to selectively excite said display elements in said each section for said predetermined period of time; said display data synthesizer circuit comprising a series output shift register for receiving bit-serially a plurality of bits of display data for one section of display elements at a first repetitive speed and producing them bit-serially at a second repetitive speed higher than said first repetitive speed; and a parallel output shift register for receiving the display data from said series output shift register and for holding it for a predetermined period of time, said parallel output shift register producing said display data bit-parallely for driving said display elements in said each section;

said first repetitive speed being so selected that said display data receiving operation of said series output shift register is performed within a time interval during which said parallel output shift register produces said display data.

2. A display data synthesizer circuit according to claim 1, in which said series output shift register includes a plurality of register sections for storing respective data groups in which said display data is divided, the data of each data group being transferred bit-serially to said parallel output shift register and the data transfers from respective data groups being carried out parallely.

3. A display data synthesizer circuit according to claim 1, in which said second repetitive speed is so selected that data transfer from said series output shift register to said parallel output shift register is completed within a time not longer than 5% of said predetermined period of time during which each display elements section is selected to be scanned.

4. A display data synthesizer circuit according to claim 2, in which said second repetitive speed is so selected that data transfer from said series output shift register to said parallel output shift register is completed within a time not longer than 5% of said predetermined period of time during which each display elements section is selected to be scanned.

5. A display panel of liquid crystal matrix type including a multiplicity of liquid crystal display elements arranged in lines and rows; said display panel comprising a display data synthesizer circuit for synthesizing line display data for the display elements included in each of said lines and holding said line display data for a predetermined period of time in order to sequentially scan and drive said lines and to selectively excite the display elements in each line during said predetermined period of time, said display data synthesizer circuit including a series output shift register for writing bit-serially the line display data for one line at a first repetitive speed and for producing said line display data bit-serially at a second repetitive speed higher than said first repetitive speed, and a parallel output shift register for receiving the line display data from said series output shift register and holding it for a predetermined period of time, said parallel output shift register producing the line display data bit-serially for driving the display elements in said line, said first repetitive speed being so selected that said display data writing operation of said series output shift register is performed in a time interval during which said parallel output shift register produces said line display data.

6. A display data synthesizer circuit according to claim 5, in which said series output shift register includes a plurality of register sections for storing respective data groups in which said line display data is divided, data of each of said groups being transferred bit-serially to said parallel output shift register, and the data transfers from respective data groups being carried out parallely.

7. A display data synthesizer circuit according to claim 5, in which said second repetitive speed is so selected that data transfer from said series output shift register to said parallel output shift register is completed within a time not longer than 5% of said predetermined period of time during which said each line is selected to be scanned.

8. A display data synthesizer circuit according to claim 6, in which said second repetitive speed is so selected that data transfer from said series output shift register to said parallel output shift register is completed within a time not longer than 5% of said predetermined period of time during which said each line is selected to be scanned.

* * * * *